(12) United States Patent
Mantri et al.

(10) Patent No.: US 10,138,428 B2
(45) Date of Patent: Nov. 27, 2018

(54) CATALYST ASSISTED CONVERSION OF BIOMASS TO BIO-OIL

(71) Applicant: RELIANCE INDUSTRIES LIMITED, Mumbai, Maharashtra (IN)

(72) Inventors: Kshudiram Mantri, West Bengal (IN); Chidambaram Mandan, Tamil Nadu (IN); Ramesh Bhujade, Maharashtra (IN); Nagesh Sharma, Gujara (IN); Raksh Vir Jasra, Gujara (IN)

(73) Assignee: Reliance Industries Limited, Mumbai (IN)

( * ) Notice: Subject to any disclaimer, the term of this patent is extended or adjusted under 35 U.S.C. 154(b) by 258 days.

(21) Appl. No.: 14/867,415

(22) Filed: Sep. 28, 2015

(65) Prior Publication Data

US 2016/0090537 A1   Mar. 31, 2016

Related U.S. Application Data

(63) Continuation-in-part of application No. 14/652,283, filed as application No. PCT/IN2014/000313 on May 14, 2015.

(30) Foreign Application Priority Data

Sep. 26, 2014   (IN) .......................... 3081/MUM/2014

(51) Int. Cl.
| | | |
|---|---|---|
| *C10G 1/06* | (2006.01) | |
| *C10G 1/00* | (2006.01) | |
| *C10G 1/08* | (2006.01) | |
| *C10G 3/00* | (2006.01) | |

(52) U.S. Cl.
CPC ............. *C10G 1/065* (2013.01); *C10G 1/083* (2013.01); *C10G 1/086* (2013.01); *C10G 3/45* (2013.01); *C10G 3/47* (2013.01); *C10G 3/48* (2013.01); *C10G 3/50* (2013.01); *C10G 2300/1014* (2013.01); *Y02E 50/14* (2013.01); *Y02P 30/20* (2015.11)

(58) Field of Classification Search
CPC . C10G 1/06; C10G 1/065; C10G 3/42; C10G 1/08; C10G 1/083
See application file for complete search history.

(56) References Cited

U.S. PATENT DOCUMENTS

| | | | |
|---|---|---|---|
| 2005/0197249 A1* | 9/2005 | Creyghton | ............. B01J 23/888 502/439 |
| 2012/0094879 A1* | 4/2012 | Roberts | .................... C10G 3/42 508/459 |
| 2013/0158137 A1* | 6/2013 | Oldenburg | .......... C07C 29/1518 518/702 |
| 2014/0166221 A1* | 6/2014 | Powell | ..................... C07G 1/00 162/40 |

FOREIGN PATENT DOCUMENTS

WO   2010/030196 A1   3/2010

OTHER PUBLICATIONS

Rahman et al. (Measurement of Bronsted acidity of silica-alumina solid catalyst by base exchange method, J. Surface Sci. Technol., vol. 22, No. 1-2, pp. 25-33, 2006.*
Mabey et al. (Critical review of hydrolysis of organic compounds in water under environmental conditions, 1978, Journal of Physical and Chemical Reference, vol. 7, No. 2, pp. 383-415) (Year: 1978).*
English translation of copending patent application 2899/MUM/2013.

* cited by examiner

*Primary Examiner* — Youngsul Jeong
(74) *Attorney, Agent, or Firm* — Ladas & Parry LLP

(57) ABSTRACT

The present disclosure relates to a process for the production of crude bio-oil which involves heating a mixture of biomass slurry and a mixed catalyst system in the presence of a hydrogen source at a temperature ranging from 200 to 350° C. and at a pressure ranging from 70 to 250 bars to obtain a mass containing crude bio-oil. The crude bio-oil can then be separated from said mass containing crude bio-oil. The mixed catalyst system remains in solid form and can be easily separated and reused in the next cycle of hydrothermal conversion of biomass to crude bio-oil.

13 Claims, No Drawings

CATALYST ASSISTED CONVERSION OF BIOMASS TO BIO-OIL

CROSS REFERENCE APPLICATIONS

This application is a continuation-in-part of application Ser. No. 14/652,283 filed 15 Jun. 2015, which is a 371 of International Application PCT/IN2014/000313 filed 8 May 2014, which claims priority from India Application No.: 2899/MUM/2013 filed 6 Sep. 2013, the content of which is incorporated herein by reference. This application also claims priority from India Application No.: 3081/MUM/2014 filed 26 Sep. 2014, the content of which is incorporated herein by reference.

FIELD

The present disclosure relates to a process for the production of crude bio-oil.

BACKGROUND

As used in the present disclosure, the following words and phrases are generally intended to have the meaning as set forth below, except to the extent that the context in which they are used to indicate otherwise.

Biomass:

The term biomass in the context of the present disclosure means material such as algae and aquatic biomass, organic waste, urban refuse, wood, agricultural crops or wastes, municipal wastes and the like.

Crude Bio-Oil:

The term crude bio-oil used in the context of the present disclosure means an oil or biofuel derived from biomass and which can be used as an alternative to petroleum fuel.

Biomass, a renewable energy source, can either be used directly via combustion to produce heat, or indirectly after converting it to various forms of biofuels. Biofuels are derived from biomass and are intended to provide an alternative to petroleum fuels. Conversion of biomass into biofuel can be achieved by different methods which are broadly classified into thermal, chemical and biochemical methods. Biomass comprising algae and other aquatic biomass, is a resource that shows promise for advanced biofuels because of its higher photosynthetic efficiency, faster growth rate, and higher area-specific yield relative to terrestrial biomass.

Fossil fuels such as petroleum, natural gas and coal are typically formed through the processes of thermochemical conversion (TCC) from biomass buried beneath the ground. TCC is a chemical reforming process of biomass in a heated and usually pressurized, oxygen deprived enclosure, where long-chain organic compounds break into short-chain hydrocarbons such as syngas or oil. TCC is a broad term that includes gasification, including the Fisher-Tropsch process, direct liquefaction, hydrothermal liquefaction and pyrolysis.

Pyrolysis is a heating process of dried biomass to directly produce syngas and/or oil. Both gasification and pyrolysis require dried biomass as feedstock and the processes occur in an environment higher than 600° C.

Hydrothermal liquefaction (HTL) is a technology for converting high-moisture waste biomass into energy dense "crude bio-oil" (CBO) that can be used for direct combustion or refined for transportation grade fuels.

HTL, also called hydrous pyrolysis, is a process for the reduction of complex organic materials such as bio-waste or biomass into crude oil and other chemicals.

Hydrothermal Liquefaction (HTL) technique, which involves the application of heat and pressure on a biomass medium, has an advantage that lipids and other organic components can be efficiently converted while the biomass is in wet condition. During HTL, high moisture biomass is subjected to elevated temperature (250-400° C.) and pressure (up to 225 bars) in order to break down and reform the chemical building blocks into crude bio-oil (CBO). HTL of biomass gives only crude bio-oil that needs to be further treated/refined to get the finished crude oil products. The hydrothermal process breaks down bio macromolecules in the wet biomass and promotes heteroatom removal.

WO2010030196 suggests the use of a phosphate catalyst for hydrothermal conversion of biomass into crude bio-oil (CBO). Although the products formed from the process are useful, the recovery of the catalyst used in the process is difficult and fresh catalyst needs to be added to each reaction. Also, the phosphate catalyst usually operates at a pH greater than 7, which may have a limiting action on the product range. Metal oxides are also known to provide catalytic activity for the conversion of biomass to CBO; these again use basic conditions and there are costs associated with the recovery of the catalyst.

There is, therefore, a need to develop a catalyst assisted process for the conversion of biomass to crude bio-oil (CBO), wherein the catalysts can be recovered and recycled; and the CBO so produced is compatible with petroleum crude used in the refinery process.

OBJECTS

Some of the objects of the present disclosure which at least one embodiment is adapted to provide, are described herein below:

It is an object of the present disclosure to provide a process for the production of crude bio-oil.

It is another object of the present disclosure to provide a simple, energy efficient, time saving and high yielding process for the production of crude bio-oil.

It is a still another object of the present disclosure to provide a process which is capable of producing crude bio-oil that is compatible with petroleum crude used in the refinery process.

It is yet another object of the present disclosure to provide a process which is capable of producing crude bio-oil containing high carbon content.

It is yet another object of the present disclosure to provide a process which is capable of producing crude bio-oil which is free from heteroatoms such as oxygen, nitrogen, sulfur and phosphorus.

Other objects and advantages of the present disclosure will be more apparent from the following description which is not intended to limit the scope of the present disclosure.

SUMMARY

The present disclosure relates to a mixed catalyst system assisted process for the conversion of biomass into crude bio-oil. In accordance with the present disclosure crude bio-oil is produced from biomass at high temperature and pressure in the presence of a hydrogen source using a mixed catalyst system. The mixed catalyst system in accordance with the present disclosure comprises a heterogeneous catalyst and a surfactant. The heterogeneous catalyst and the surfactant remove oxygen, nitrogen and sulfur from the crude bio-oil and thereby, improve the quality of the crude bio-oil.

The heterogeneous catalyst in accordance with the present disclosure comprises at least one metal, at least one carrier and at least one solubilizing agent. The amount of metal in the heterogeneous catalyst ranges from 0.1 to 15 w/w %. The carrier comprises at least one support in an amount ranging from 30 to 99 wt % with respect to the carrier and at least one binder in an amount ranging from 0.001 to 70 wt % with respect to the carrier.

DETAILED DESCRIPTION

This invention is not based on a biological resource but on a value added product, and the Crude bio-oil (CBO), which is the subject of this invention, is a value added product, and the original biomass such as algae is not recognizable and is not physically separable from the final product.

The co-pending patent application No. 2899/MUM/2013 overcomes the drawbacks associated with the known hydrothermal liquefaction methods for the conversion of biomass to crude bio-oil, such as time consumption, energy consumption and low yield and discloses a simple, energy efficient, time saving and high yielding process for hydrothermal conversion of biomass to bio crude. 2899/MUM/2013 particularly provides a method for the preparation of a catalyst at room temperature, having improved catalytic activity when used for hydrothermal conversion of biomass to crude bio-oil. Crude bio-oil obtained by known hydrothermal processes is incompatible with petroleum crude oil as it contains free fatty acids, N-containing heterocyclic compounds, polycyclic aromatics, unsaturated compounds and other undetectable heavier molecules.

The present disclosure provides a process for producing crude bio-oil from biomass, wherein the crude bio-oil is compatible with petroleum crude used in the refinery process.

Accordingly, the present disclosure provides a process for the production of crude bio-oil from biomass using a mixed catalyst system. The process involves the following steps.

In the first step, a slurry of bio-mass is prepared in a medium. The concentration of biomass in the slurry can range from 5 to 35 wt %. In accordance with one embodiment, the biomass utilized for preparing the slurry is an alga. The alga can be selected from the group comprising Chlorophytes, Cyanophytes, Heterokontophytes and Protists. Non-limiting examples of Chlorophytes include *Chlorella, Oedogonium, Dictyosphaerium, Spirogyra, Chara, Nitella* and *Hydrodictyon*. Non-limiting examples of Cyanophytes include *Spirulina, Microcystis, Anabaena, Nodularia, Oscillatoria* and *Phormidium*. Heterokontophytes like *Nannochloropsis* and Protists like *Euglena* can also be utilized for production of crude bio-oil.

In one exemplary embodiment of the present disclosure, the algae utilized is *Nannochloropsis* and *Spirulina*.

The source and geographical origin of *Nannochloropsis* is Solix BioSystems, Inc., USA or Proviron, Belgium; and the source and geographical origin of *Spirulina* is Jamnagar (Gujarat) & Alibagh (Maharashtra), India.

In the second step, a mixed catalyst system is added to the biomass slurry to obtain a mixture. The amount of the mixed catalyst system added to the biomass slurry ranges from 1 to 10 wt % with respect to the biomass.

The mixed catalyst system in accordance with the present invention comprises a heterogeneous catalyst and at least one surfactant. The heterogeneous catalyst in accordance with the present disclosure comprises at least one metal, at least one carrier and at least one solubilizing agent.

The surfactants include anionic, cationic, nonionic and amphoteric surfactants. The surfactants in accordance with the present disclosure include but are not limited to quaternary ammonium compounds, benzyl, alkyl benzenes, alpha olefins, alkyl, fatty acid ester, octyl, dioctyl, trioctyl, phosphate esters. C10-C13 ethoxylates, cetyloleyl ethoxylates, PEG, Block copolymers, sorbitan esters, sorbitan ester ethoxylates, amineethoxylates, castor oil ethoxylates, fatty acid ethoxylates, phenol ethoxylates, fatty acid alkanamides, amine oxides, betaines, amphopropionates, aminodipropionates and mono laurates.

In one embodiment, the surfactant used is a cationic surfactant. In one exemplary embodiment, the cationic surfactant is Cetyltrimethylammonium Bromide.

The metal used in the heterogeneous catalyst includes but is not limited to group Ib metals, group IIb metals, group IVb metals, group Vb metals, group VIb metals, group VIIb metals, group VIII metals and noble metals. Particularly, the metal can be selected from the group consisting nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh).

In accordance with one embodiment of the present disclosure, the metal is selected from the group of compounds containing cations, which includes but is not limited to nickel (Ni), molybdenum (Mo), cobalt (Co), zinc (Zn), zirconium (Zr), vanadium (V), tungsten (W), rhenium (Re), platinum (Pt), palladium (Pd), ruthenium (Ru) and rhodium (Rh); and anions, which includes but is not limited to chlorides, bromides, fluorides, iodides, sulfates, phosphates, phosphonates, nitrates, nitrites, carbonates, acetates, bicarbonates, hydroxides and oxides.

The amount of metal in the heterogeneous catalyst ranges from 0.1 to 15 w/w %.

Non-limiting examples of the solubilizing agent present in the heterogeneous catalyst include ammonia solution, piperidine, pyrrolidine, morpholine, piperazine hydrate, 2-methylcyclohexyl amine, cyclohexylamine and hexamethyleneimine. In one embodiment, the solubilizing agent is hexamethyleneimine. The amount of the solubilizing agent in the heterogeneous catalyst of the present disclosure ranges from 4 to 10 wt %.

The amount of the carrier in the heterogeneous catalyst ranges from 75 to 96 wt %. The carrier in accordance with the present disclosure comprises at least one support in an amount ranging from 30 to 99 wt % with respect to the carrier and at least one binder in an amount ranging from 0.001 to 70 wt % with respect to the carrier. The carrier may further comprise at least one peptizing agent.

In one embodiment of the present disclosure, the support is selected from the group consisting of alumina, silica and zirconia.

In another embodiment of the present disclosure, the binder is selected from the group consisting of aluminophosphate, pseudoboehmite, aluminium oxide, silica and ludox silica.

In one embodiment, the carrier employed in the heterogeneous catalyst preparation is in the form of an extrudate, having surface area ranging from 25 to 300 $m^2/g$.

In one embodiment the support is in the form of extrudates having lengths ranging from 4 to 6 mm and diameter ranging from 1 to 2 mm.

In still another embodiment of the present disclosure, the carrier is prepared by mixing at least one support, at least one binder and at least one peptizing agent in any order thereof.

The ratio between the heterogeneous catalyst and the surfactant in accordance with the present disclosure ranges from 9:1 to 1:9 wt %.

The heterogeneous catalyst employed for the production of crude bio-oil from biomass is characterized by the total acid strength ranging from 0.05 to 3.5 mmole/gm of ammonia.

In the third step, the mixture is heated at a temperature ranging from 200 to 350° C. and at a pressure ranging from 70 to 250 bars for a time period ranging from 10 to 180 minutes to obtain a mass containing crude bio-oil. The mixture is heated in the presence of a hydrogen source. In an exemplary embodiment of the present disclosure the hydrogen source is $H_2$ gas.

During the course of heating, the biomass breaks down and the chemical building blocks get reformed into crude bio-oil. The catalytic hydrothermal process employing the mixed catalyst system of the present disclosure breaks down the bio macromolecules present in the biomass and promotes removal of heteroatoms to result into crude bio-oil. After cooling, the products can be collected, filtered and separated by using a separating funnel unit or by any other similar method; and the products are further concentrated.

The surfactants used in the present disclosure are highly soluble and can be recovered from the aqueous phase after the hydrothermal liquefaction. The recovered surfactant can be reused in the next cycle. The heterogeneous catalyst used in the present disclosure remains in solid form and can be easily separated by any known method and reused in the next cycle of hydrothermal conversion of biomass into crude bio-oil.

In one embodiment of the present disclosure the heterogeneous catalyst is regenerated by filtration, washing, calcination and reduction.

A lower boiling temperature of the different CBO components is indicative of a better quality product and is one of the characterizations done in the refining industry to evaluate petroleum crude.

The yield of the crude bio-oil obtained by the process of the present disclosure by using the mixed catalyst system as specified above ranges from 45% to 80% and the carbon content of said crude bio-oil ranges from 60 to 80%.

The mixed catalyst system of the present disclosure is highly stable during the hydrothermal liquefaction.

In accordance with an exemplary embodiment of the present disclosure, addition of a mixed catalyst system comprising CoMo/$Al_2O_3$ and at least one surfactant improves the quality and yield of the crude bio-oil obtained. The amount of hetero atoms such as, Nitrogen, Oxygen and Sulfur reduces when CoMo heterogeneous catalyst is used along with at least one surfactant in a catalyst assisted HTL reaction. Also, a lower boiling temperature of the CBO components is observed, which is illustrated in table-2.

The present disclosure is further described in light of the following examples which is set forth for illustration purpose only and not to be construed for limiting the scope of the disclosure.

Example 1

HTL of *Nannochloropsis* Using CoMo/$Al_2O_3$ as a Heterogeneous Catalyst 21 g *Nannochloropsis* (Solix BioSystems, USA) as 20% slurry in water was loaded in a 300 ml capacity HTHP reactor. 10 wt % of powdered CoMo/$Al_2O_3$ heterogeneous catalyst (1.897 g w.r.t. ash and moisture free algae) of the present disclosure was added to the reactor. The reactor was then closed. Leak check was done using nitrogen at 120 bar. Nitrogen pressure was released and the required amount of hydrogen (35 bar) was filled and the reaction mixture was heated to a reaction temperature of 350° C. with 500 rpm stirring speed. After 30 minutes, the reactor was cooled using chilled water and the gas was collected for gas analysis. After cooling, the reactor was opened and the product was collected in a beaker. Oil, aqueous and solid phases were separated and measured individually. The mixture was filtered using a Buckner flask. The obtained powder was washed with dichloromethane and water and dried. The liquids (Oil and aqueous phase) were separated by gravimetric method.

Example 2

HTL of *Nannochloropsis* Using CoMo/$Al_2O_3$ and Cetyltrimethylammonium Bromide (CTAB) as a Mixed Catalyst System 22 g *Nannochloropsis* (Solix BioSystems, USA) as 20% slurry in water was loaded in a 300 ml capacity HTHP reactor. 9 wt % of powder Cetyltrimethylammonium bromide (CTAB) (1.7892 g) and 1 wt % of CoMo/$Al_2O_3$ (0.1988 g) w.r.t. ash and moisture free algae of the present disclosure was added to the reactor. The reactor was then closed. Leak check was done using nitrogen at 120 bar. Nitrogen pressure was released and the required amount of hydrogen (35 bar) was filled and the reaction mixture was heated to a reaction temperature of 350° C. with 500 rpm stirring speed. After 30 minutes, the reactor was cooled using chilled water and the gas was collected for gas analysis. After cooling, the reactor was opened and the product was collected in a beaker. Oil, aqueous and solid phases were separated and measured individually. The mixture was filtered using a Buckner flask. The obtained powder was washed with dichloromethane and water and dried. The liquids (oil and aqueous phase) were separated by gravimetric method.

Example 3

HTL of *Nannochloropsis* Using Cetyltrimethylammonium Bromide (CTAB) as a Surfactant Catalyst 22 g *Nannochloropsis* (SolixBioSystems, USA) as 20% slurry in water was loaded in a 300 ml capacity HTHP reactor. 10 wt % of powder Cetyltrimethylammonium bromide as a surfactant catalyst (1.988 g w.r.t. ash and moisture free algae) of the present disclosure was added to the reactor. The reactor was then closed. Leak check was done using nitrogen at 120 bar. Nitrogen pressure was released and the required amount of hydrogen (35 bar) was filled and the reaction mixture was heated to a reaction temperature of 350° C. with 500 rpm stirring speed. After 30 minutes, the reactor was cooled using chilled water and the gas was collected for gas analysis. After cooling, the reactor was opened and the product was collected in a beaker. Oil, aqueous and solid phases were separated and measured individually. The mixture was filtered using a Buckner flask. The obtained powder was washed with dichloromethane and water and dried. The liquids (oil and aqueous phase) were separated by gravimetric method.

Similar experiments were carried out by using various ratios of the heterogeneous catalyst and the surfactant. The CBO yield obtained by the hydrothermal liquefaction of algal biomass using the catalyst in accordance with the present disclosure is depicted in Table-1.

TABLE 1

Catalyst and surfactant assisted HTL of biomass

| No. | Algae Species | CoMo/Al$_2$O$_3$, wt % | CTAB, wt % | CBO Yield, % |
|---|---|---|---|---|
| 1 | Nannochloropsis | 10 | 0 | 68 |
| 2 | Nannochloropsis | 9 | 1 | 70 |
| 3 | Nannochloropsis | 5 | 5 | 67 |
| 4 | Nannochloropsis | 1 | 9 | 72 |
| 5 | Spirulina | 5 | 5 | 60 |
| 6 | Spirulina | 10 | 0 | 57 |

From the above table, it is clear that the maximum yield is obtained when 1:9 ratio of CoMo/Al$_2$O$_3$:CTAB was used.

The major advantage of using a mixed catalyst in accordance with the present disclosure is obtaining a crude bio-oil having a better yield in terms of quality and quantity, with lower boiling temperature products having less hetero atoms in the hydrocarbon.

TABLE 2

Simulated distillation for the CBO using three different catalysts

| CoMo/Al$_2$O$_3$ | | CTAB | | CoMo/Al$_2$O$_3$: CTAB (1:9) | |
|---|---|---|---|---|---|
| Recovered Mass (%) | Temperature (° C.) | Recovered Mass (%) | Temperature (° C.) | Recovered Mass (%) | Temperature (° C.) |
| 1 | 169 | 1 | 173 | 1 | 134 |
| 20 | 302 | 20 | 316 | 20 | 287 |
| 30 | 348 | 30 | 346 | 30 | 327 |
| 100 | 711 | 100 | 709 | 100 | 700 |

Table 2 demonstrates the amount of mass recovered, after injecting 100% mass in the Gas chromatography (GC), at different temperatures using CoMo/Al2O3, CTAB and CoMo/Al$_2$O$_3$:CTAB (in 1:9 proportions). Further from table-2 above, it is clear that the CBO components have a lower boiling temperature when using a mixed catalyst system of the present disclosure.

At particular mass recovery stage, different temperature ranges are required since the chemical composition of all three oils is different with respect to the carbon chain, the heteroatoms and the orientation of the molecule; and since the catalyst and combinations used are also different.

Technical Advance and Economic Significance

The present disclosure provides a simple, energy efficient, time saving and high yielding process for production of crude bio-oil using a mixed catalyst system.

The present disclosure provides a process which is capable of producing crude bio-oil compatible with petroleum bio-oil.

The present disclosure provides a process which is capable of producing crude bio-oil containing high carbon content.

The present disclosure provides crude bio-oil which is free from heteroatoms such as oxygen, nitrogen, sulfur and phosphorus.

The present disclosure provides a crude bio-oil with components having a lower boiling temperature.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing bio-oil, said process comprising:
   a. preparing and/or collecting a biomass slurry;
   b. adding a mixed catalyst system comprising a heterogeneous catalyst and at least one surfactant selected from the group consisting of anionic, cationic and amphoteric surfactants to the biomass slurry to obtain a mixture, wherein the heterogeneous catalyst has a total acid strength ranging from 0.05 to 1.5 mmole/gm of ammonia;
   c. heating said mixture in the presence of a hydrogen source at a temperature ranging from 200 to 350° C. and at a pressure ranging from 70 to 250 bars for a time period ranging from 10 to 180 minutes to obtain a mass containing crude bio-oil; and
   d. separating the crude bio-oil from the mass containing crude bio-oil to obtain a separated crude bio-oil and a sludge containing a residue and the mixed catalyst system,
      wherein a weight ratio of said heterogeneous catalyst to said at least one surfactant is 9:1 or 1:9.

2. The process as claimed in claim 1, wherein said hydrogen source is hydrogen gas.

3. The process as claimed in claim 1, wherein the step d further comprises recovering the mixed catalyst system from the sludge and recycling the recovered mixed catalyst system to the step b.

4. The process as claimed in claim 1, wherein a concentration of biomass in the bio-mass slurry ranges from 5 to 35 wt %.

5. The process as claimed in claim 1, wherein said biomass is at least one alga selected from the group consisting of Chlorophytes, Cyanophytes, Heterokontophytes and Protists.

6. The process as claimed in claim 5, wherein said alga is at least one selected from the group consisting of *Chlorella*, Oedogonium, Dictyosphaerium, Spirogyra, Chara, Nitella, *Hydrodictyon, Spirulina, Microcystis, Anabaena*, Nodularia, Oscillatoria, *Phormidium, Nannochloropsis* and *Euglena*.

7. The process as claimed in claim 1, wherein a carbon content of said crude bio-oil ranges from 60 wt % and 80 wt %.

8. The process as claimed in claim 1, wherein a components of the crude bio-oil are compatible with petroleum crude used in a refinery process.

9. The process as claimed in claim 1, wherein the heterogeneous catalyst comprises:
   i. at least one metal in an amount of 0.1 to 15 wt %, wherein the metal is selected from the group consisting of Group IB metals, Group IIB metals, Group IVB metals, Group VB metals, Group VIB metals, and Group VIIB metals, Group VIII metals;
   ii. at least one carrier in an amount of 75 to 96 wt %; and
   iii. at least one solubilizing agent in an amount of 4 to 10 wt %, wherein said solubilizing agent is selected from the group consisting of ammonia solution, piperidine, pyrrolidine, morpholine, piperazine hydrate, 2-methylcyclohexyl amine, cyclohexylamine and hexamethyleneimine.

10. The process as claimed in claim 9, wherein said carrier comprises:
   a. at least one support in an amount of 30 to 99 wt %, wherein said support is selected from the group consisting of alumina, silica and zirconia; and
   b. at least one binder in amount of 0.001 to 70 wt %, wherein said binder is selected from the group consisting of aluminophosphate, psuedoboehmite, aluminaum oxide, silica and colloidal silica solution.

11. The process as claimed in claim 9, wherein the metal is selected from the group consisting of nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh).

12. The process as claimed in claim 9, wherein the carrier is in the form of extrudates and has a length ranging from 4 to 6 mm, a diameter ranging from 1 to 2 mm and a surface area ranging from 25 to 300 $m^2$/gm.

13. The process as claimed in claim 1, wherein the surfactant is at least one selected from the group consisting of quaternary ammonium compounds, cetyl oleyl ethoxylates, polyethylene glycol (PEG), fatty acid alkanamides, amine oxides, betaines, amphopropionates, aminodipropionates and monolaurates.

* * * * *